United States Patent
Shinji et al.

(10) Patent No.: US 8,427,779 B2
(45) Date of Patent: Apr. 23, 2013

(54) DISK DRIVE DEVICE WITH BEARING WITH IMPROVED IMPACT RESISTANCE

(75) Inventors: Naoki Shinji, Shizuoka (JP); Takuji Yamada, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 230 days.

(21) Appl. No.: 12/769,596

(22) Filed: Apr. 28, 2010

(65) Prior Publication Data

US 2010/0328819 A1  Dec. 30, 2010

(30) Foreign Application Priority Data

Jun. 24, 2009 (JP) ................................. 2009-150212

(51) Int. Cl.
*G11B 17/02* (2006.01)
*H02K 5/16* (2006.01)

(52) U.S. Cl.
USPC .......................... 360/99.08; 310/90; 310/67 R

(58) Field of Classification Search ............... 360/98.07, 360/99.04, 99.08; 310/90, 67 R; 384/112
See application file for complete search history.

(56) References Cited

U.S. PATENT DOCUMENTS

| | | | | |
|---|---|---|---|---|
| 4,612,468 A | * | 9/1986 | Sturm et al. ................ | 310/67 R |
| 5,097,164 A | * | 3/1992 | Nakasugi et al. ............ | 310/88 |
| 5,373,407 A | * | 12/1994 | Stupak et al. .............. | 360/99.08 |
| 5,452,156 A | * | 9/1995 | Uda et al. ................... | 360/99.19 |
| 6,242,826 B1 | * | 6/2001 | Saito et al. ................. | 310/51 |
| 6,252,322 B1 | * | 6/2001 | Kawawada et al. ........... | 310/90 |
| 6,669,368 B2 | * | 12/2003 | Takayanagi ................. | 384/100 |
| 7,005,768 B2 | * | 2/2006 | Tamaoka et al. ............. | 310/90 |
| 7,021,829 B2 | * | 4/2006 | Tamaoka ..................... | 384/112 |
| 7,088,023 B1 | * | 8/2006 | Gomyo et al. ............... | 310/90 |
| 7,542,232 B2 | * | 6/2009 | Watanabe et al. ........... | 360/99.08 |
| 7,974,041 B2 | * | 7/2011 | Suzuki ....................... | 360/99.16 |
| 2002/0180290 A1 | * | 12/2002 | Takayanagi ................. | 310/90 |

FOREIGN PATENT DOCUMENTS

JP  2007-198555  8/2007

* cited by examiner

*Primary Examiner* — Brian Miller
(74) *Attorney, Agent, or Firm* — Fulwider Patton LLP

(57) ABSTRACT

In a disk drive device, a recording disk is mounted on a rotor. A base has a bearing hole, the center of which is along the rotational axis of the rotor. A bearing unit rotatably supports the rotor with respect to the base, the bearing unit being glued to the bearing hole. A ring-shaped first groove, the center of which is along the rotational axis, is arranged on a side surface of the bearing hole. A ring-shaped second groove, the center of which is along the rotational axis, is arranged on an outer surface of the housing, the outer surface contacting the side surface of the bearing hole. The position of the second groove with respect to its direction along the rotational axis is different from the position of the first groove with respect to its direction along the rotational axis. The base and the bearing unit are electrically connected by a conductive resin applied along an edge portion of the bearing hole, the edge portion being on a lower surface of the base.

21 Claims, 7 Drawing Sheets

DISK DRIVE DEVICE WITH BEARING WITH IMPROVED IMPACT RESISTANCE

CROSS-REFERENCE TO RELATED APPLICATION

This application is based upon and claims the benefit of priority from the prior Japanese Patent Application No. 2009-150212, filed on Jun. 24, 2009, the entire content of which is incorporated herein by reference.

BACKGROUND OF THE INVENTION

1. Field of the Invention

The present invention relates to a disk drive device for rotating a disk.

2. Description of the Related Art

Disk drive devices, such as hard disk drives, have become miniaturized. The capacity of a disk drive device has also been increased. Such disk drive devices have been installed in various types of electronic devices. In particular, such disk drive devices have been installed in portable electronic devices such as cellular phones or portable music players. With regard to disk drive devices that are installed in portable electronic devices, their impact resistance has been required to be improved so that the disk drive devices can withstand impacts, such as those due to dropping, compared with the case of stationary electronic devices such as personal computers.

On the other hand, in general, portable electronic devices have been required to be made thinner, smaller, and lighter. Therefore, disk drive devices that are installed in portable electronic devices have also been required to be made thinner, smaller, and lighter. However, it is possible that the impact resistance decreases in the course of making the disk drive devices thinner, smaller, and lighter. It can be said that there is a trade-off imposed on the disk drive devices that are installed in portable electronic devices.

For example, in the case where the disk drive device is used for a desk-top PC, any impact applied to the disk drive device would be small, and it would not be likely that the disk drive device malfunctions in normal usage. However, in the case where the disk drive device is used for portable electronic devices, the disk drive device may receive a large impact such as those due to dropping. There would be many cases where a large impact is applied to the disk drive device. Therefore, there is a possibility that the disk drive device malfunctions in normal usage unless the disk drive device has considerable impact resistance.

In order to cope with this, the prior art installs a fluid dynamic bearing unit (hereinafter referred to as "FDB") in a disk drive device as disclosed in Japanese Patent Application Publication No. 2007-198555. In this FDB, a flange portion is sandwiched between an extended portion of a sleeve and the end surface of a housing. The flange portion is formed in an inner cylindrical region. A lubricant is filled in between the flange portion and the extended portion of the sleeve, and the lubricant is also filled in between the flange portion and the end surface of the housing.

SUMMARY OF THE INVENTION

Under the above circumstances, the inventors of the present invention encountered the following concern: as shown in Japanese Patent Application Publication No. 2007-198555, for example, for a typical disk drive device, the FDB is fixed to a base, and a hub is rotatably supported with respect to the base by the FDB. A magnetic recording disk is mounted on the hub and rotated. When acceleration due to an impact is applied to such a disk drive device, a force is applied to a contact portion between the FDB and the base, the strength of the force given by multiplying the acceleration due to the impact by sum of the mass of the magnetic recording disk, the hub, and the FDB.

In order to make the disk drive device thinner, it may be necessary to shorten the length, in the direction of the rotational axis, of the contact portion between the FDB and the base. However, shortening this length may weaken the glue strength, and the contact portion may not be able to stand the above mentioned force according to the circumstances.

The present invention addresses these disadvantages, and a general purpose of one embodiment of the present invention is to provide a disk drive device that has good impact resistance.

An embodiment of the present invention relates to a disk drive device. This disk drive device comprises: a rotor on which a recording disk is to be mounted; a base having a bearing hole, the center of which is along the rotational axis of the rotor; and a bearing unit rotatably supporting the rotor with respect to the base, the bearing unit being glued in the bearing hole. A ring-shaped first groove, the center of which is along the rotational axis, is arranged on a side surface of the bearing hole. A ring-shaped second groove, the center of which is along the rotational axis, is arranged on a cylindrical surface of the bearing unit, the cylindrical surface contacting the side surface of the bearing hole. The position of the second groove with respect to its direction along the rotational axis is different from the position of the first groove with respect to its direction along the rotational axis. The base and the bearing unit are electrically connected by a conductive resin applied along an edge portion of the bearing hole, the edge portion being on a second surface of the base that is on the opposite side of a first surface of the base on which the rotor is arranged.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

The disk drive device according to the embodiment of the present invention is preferably used as a hard disk drive that has a magnetic recording disk.

In the disk drive device according to the present embodiment, the bearing unit is inserted into the bearing hole arranged on the base, and the bearing unit is glued in the bearing hole. Ring-shaped grooves are formed on the side surface of the bearing hole and the glue surface of the bearing unit. This can reduce the amount of glue that spills over from the bottom surface of the base in the process of inserting. In addition, the glue strength is strengthened. Furthermore, the air-tightness at the glued portion can be improved.

Figure 1A:
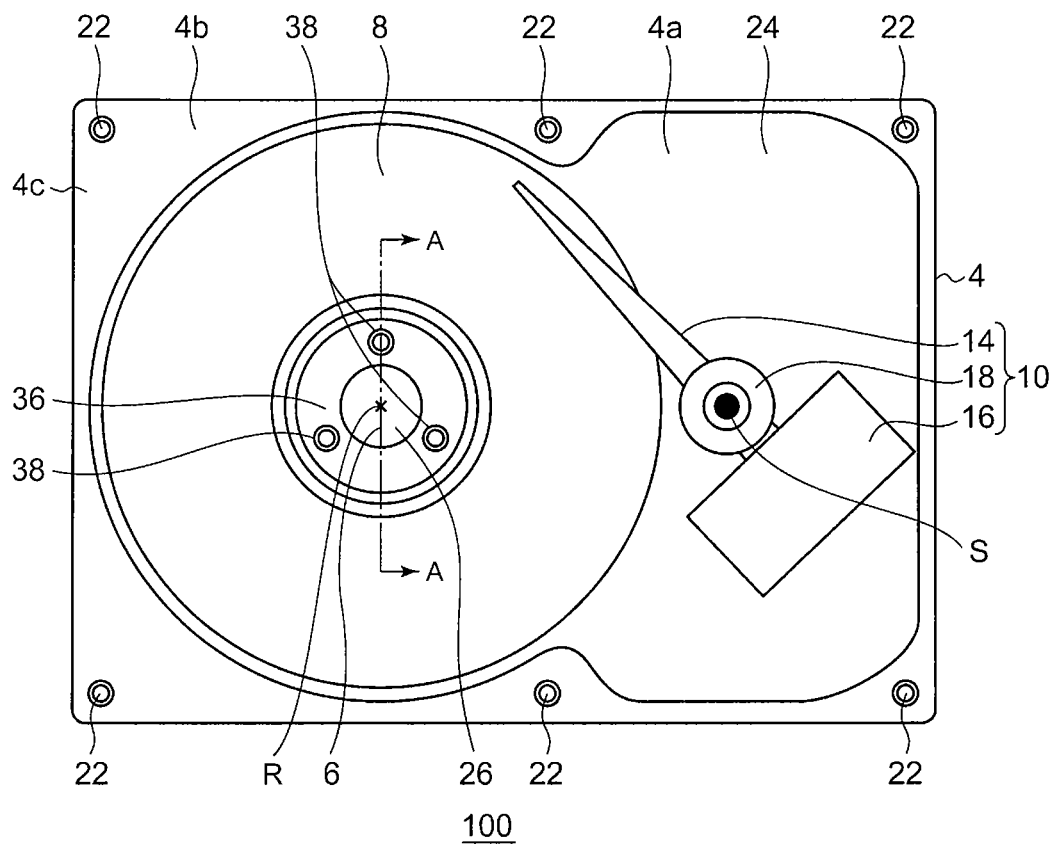
FIG. 1A is a top view of a disk drive device according to an embodiment of the present invention.
Figure 1B:
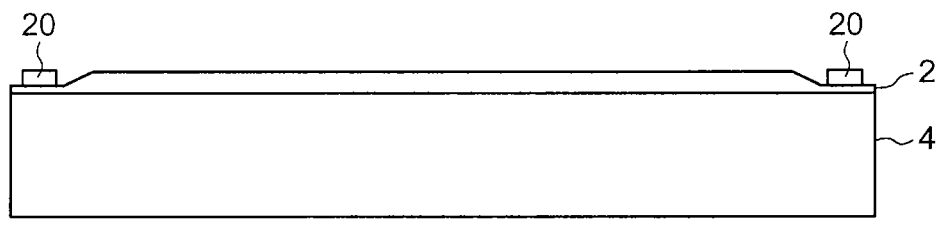
FIG. 1B is a side view of the disk drive device according to the embodiment of the present invention.

FIG. 1A is a top view of the disk drive device 100 according to the embodiment. FIG. 1B is a side view of the disk drive device 100 according to the embodiment. In FIG. 1A, the disk drive device 100 is shown without a top cover 2 in order to show the inside of the disk drive device 100. The disk drive device 100 comprises: a base 4; a rotor 6; a magnetic recording disk 8; a data read/write unit 10; and the top cover 2.

Hereinafter, it is assumed that the side of the base 4 on which the rotor 6 is installed (upside of the plane of paper in FIG. 1A) is the "upper" side.

The magnetic recording disk 8 is mounted on the rotor 6, and rotates with the rotor 6. The rotor 6 is rotatably mounted to the base 4 through the bearing unit 12, which is not shown in FIG. 1A. The base 4 is produced by die-casting an alloy of aluminum. The base 4 includes: a bottom plate 4a forming the bottom portion of the disk drive device 100; and an outer circumference wall 4b formed along the outer circumference of the bottom plate 4a so that the outer circumference wall 4b surrounds an installation region of the magnetic recording disk 8. Six screw holes 22 are formed on the upper surface 4c of the outer circumference wall 4b.

The data read/write unit 10 includes: a read/write head (not shown); a swing arm 14; a voice coil motor 16; and a pivot assembly 18. The read/write head is attached to the tip of the swing arm 14. The read/write head records data onto and reads out data from the magnetic recording disk 8. The pivot assembly 18 swingably supports the swing arm 14 with respect to the base 4 around the head rotation axis S. The voice coil motor 16 swings the swing arm 14 around the head rotation axis S and moves the read/write head to the desired position on the upper surface of the magnetic recording disk 8. The voice coil motor 16 and the pivot assembly 18 are constructed using a known technique for controlling the position of the head.

FIG. 1B is a side view of the disk drive device 100 according to the embodiment. The top cover 6 is fixed onto the upper surface 4c of the outer circumference wall 4b of the base 4 using six screws 20. The six screws 20 correspond to the six screw holes 22, respectively. In particular, the top cover 2 and the upper surface 4c of the outer circumference wall 4b are fixed together so that the joint portion between both does not create a leak into the inside of the disk drive device 100. The inside of the disk drive device 100, for example, is a clean space 24 surrounded by the bottom plate 4a of the base 4 and the outer circumference wall 4b of the base 4 and the top cover 2. This clean space 24 is designed so that the clean space 24 is sealed, in other words, there is neither leakage from the outside or on the inside. The clean space 24 is filled with clean air, with particles removed. This can suppress adhesion of contaminants, such as particles, onto the magnetic recording disk 8 and can increase the reliability of the disk drive device 100.

Figure 2:
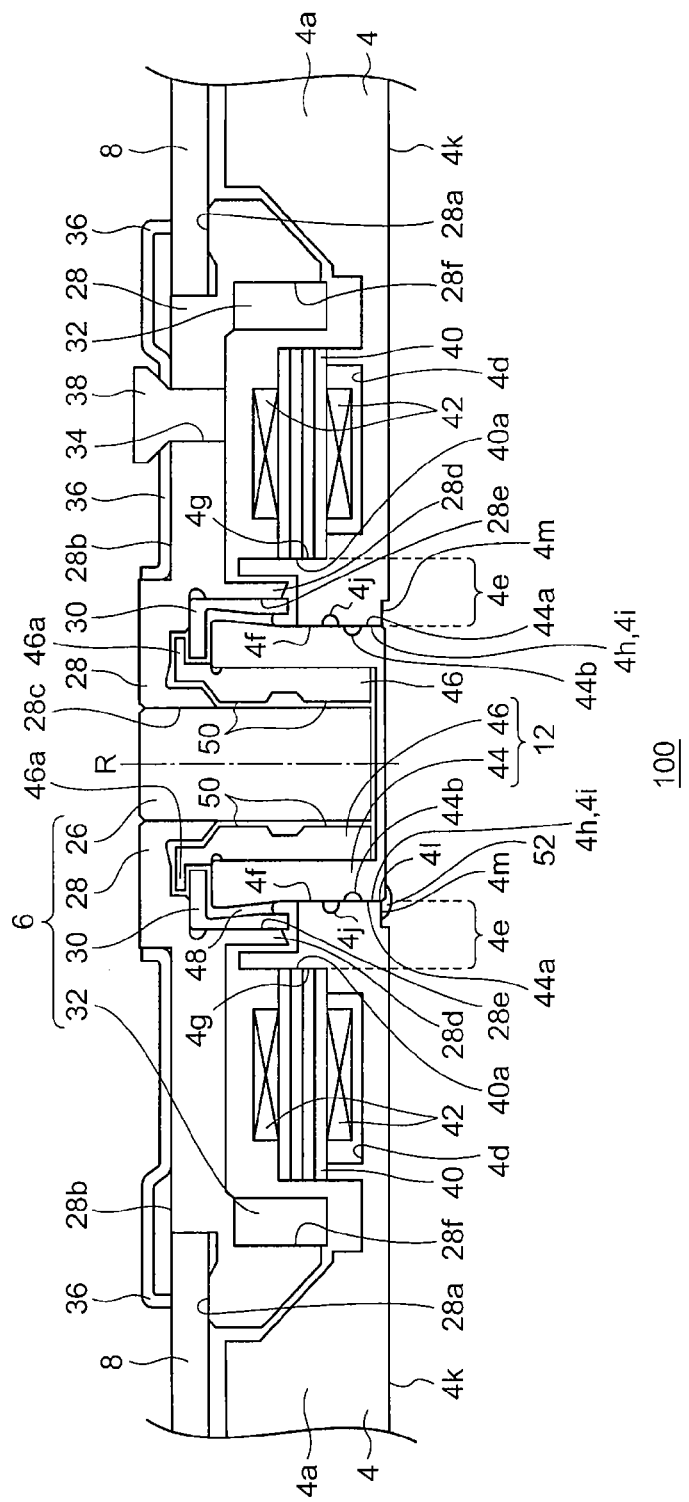
FIG. 2 is a view that is sectioned along the line A-A, as illustrated in FIG. 1A.

FIG. 2 is a view that is sectioned along the line A-A, as illustrated in FIG. 1A. The disk drive device 100 further comprises a laminated core 40 and coils 42. The core 40 has a ring portion and nine teeth, which extend radially from the ring portion, and is fixed on the upper surface 4d side of the base 4. The laminated core 40 is formed by laminating four thin electro-magnetic steel plates and mechanically integrating them. An insulation coating is applied onto the surface of the laminated core 40 by electrodeposition coating or powder coating. Each of the coils 42 is wound around one of the nine teeth, respectively. A driving flux is generated along the teeth by applying a three-phase sinusoidal driving current through the coils 42. A ring-shaped wall 4e, the center of which is along the rotational axis R of the rotor 6, is formed on the upper surface 4d of the base 4. An inner surface 4f of the ring-shaped wall 4e forms a part of the side surface of the after-mentioned bearing hole 4h arranged on the base 4. The laminated core 40, through the central hole 40a of the ring portion of the laminated core 40, is fitted to the outer surface 4g of the ring-shaped wall 4e with a press-fit or clearance fit and glued thereon. One example of how the laminated core 40 is fitted is that the laminated core 40 is fixed at the position where the laminated core 40 surrounds a portion of the side surface of the bearing hole 4h, the portion contacting the cylindrical surface of the bearing unit 12 (i.e., the outer surface 44a of the housing 44). In this case, by going through the process in which the bearing unit 12 is mounted on the base 4 after the laminated core 40 is mounted on the base 4, the ring-shaped wall 4e of the base 4 is radially fixed by the laminated core 40 when the bearing unit 12 is mounted. Therefore, the deformation of the ring-shaped wall 4e associated with the insertion of the bearing unit 12 into the bearing hole 4h can be suppressed. As a result, the squareness of the bearing unit 12 after insertion can be improved. In many cases, the base 4 is made of aluminum, which is relatively soft metal. The present embodiment may preferably used for the cases where the base 4 is made of aluminum in particular.

The bearing hole 4h, the center of which is along the rotational axis R of the rotor 6, is formed on the base 4. The bearing unit 12 includes the housing 44 and the sleeve 46 and rotatably supports the rotor 6 with respect to the base 4. The housing 44 is glued in the bearing hole 4h of the base 4 according to the after-mentioned method in FIGS. 3A, 3B, 3C, 3D, and 3E. There is a tapered portion in the upper region of the housing 44, the diameter of the tapered portion being greater than the diameter of the bearing hole 4h and the tapered portion expanding upward. The housing 44 is formed to be cup-shaped by integrating a cylindrical portion and a bottom portion as a single unit. The housing 44 is glued to the base 4 with the bottom portion downside. The cylindrical sleeve 46 is glued on the inner side surface of the housing 44. A jetty portion 46a, which radially juts out, is formed at the upper end of the sleeve 46. This jetty portion 46a, in cooperation with the flange 30, limits the motion of the rotor 6 in the axial direction.

By making the housing 44 cup-shaped, a thinner housing 44 with a higher strength can be realized compared with the case where the cylindrical portion and the bottom portion are formed separately and coupled afterwards. In addition, the assembling can be made easier.

The sleeve 46 accommodates the shaft 26. The lubricant 48 is injected into a region in between part of the rotor (the shaft 26, the flange 30, and the hub 28) and the bearing unit 12.

A pair of herringbone-shaped radial dynamic pressure grooves 50, which are vertically separated from each other, are formed on the inner surface of the sleeve 46. A first herringbone-shaped thrust dynamic pressure groove (not shown) is formed on the lower surface of the flange 30 that faces the upper surface of the housing 44. A second herringbone-shaped thrust dynamic pressure groove (not shown) is formed on the upper surface of the flange 30 that faces the lower surface of the jetty portion 46a. The rotor 6 is axially and radially supported by the dynamic pressure generated in the lubricant 48 by these dynamic pressure grooves when the rotor 6 rotates.

The pair of herringbone-shaped radial dynamic pressure grooves may be formed on the shaft 26. The first thrust dynamic pressure groove can be formed on the upper surface of the housing 44, and the second thrust dynamic pressure groove may be formed on the lower surface of the jetty portion 46a.

The rotor 6 includes: the shaft 26; the hub 28; the flange 30; and a cylindrical magnet 32. The magnetic recording disk 8 is mounted on a disk-mount surface 28a of the hub 28. Three screw holes 34 for affixing a disk are arranged on the upper surface 28b of the hub 28 at 120-degree intervals around the rotational axis R of the rotor 6. The clamper 36 is pressed against the upper surface 28b of the hub 28 by three screws 38 for affixing a disk, which are screwed in the corresponding three screw holes 34 for affixing a disk. The clamper 36 presses the magnetic recording disk 8 against the disk-mount surface 28a of the hub 28.

The hub 28 is made of soft-magnetic steel such as SUS430F. The hub 28 is formed to be predetermined cup-like shape by, for example, the press working or cutting of a steel plate. For example, the hub 28 may preferably be made of the stainless steel (DHS1) provided by Daido Steel Co., Ltd. since the stainless steel has lower outgas and is easily-worked. The hub 28 may more preferably be made of the stainless steel (DHS2) provided by Daido Steel Co., Ltd. since the stainless steel has high corrosion resistance.

The shaft 26 is fixed in the hole 28c arranged at the center of the hub 28 by using both press-fitting and glue, the hole 28c being arranged coaxially with the rotational axis R of the rotor 6. The flange 30 is in ring-shape and has a reverse L-shaped cross section. The flange 30 is glued on an inner surface 28e of a hanging portion 28d of the hub 28.

The cylindrical magnet 32 is glued on a cylindrical inner surface 28f that is an inner cylindrical surface of the cup-like hub 28. The cylindrical magnet 32 is made of a rare-earth material such as Neodymium, Iron, or Boron. The cylindrical magnet 32 faces radially towards nine teeth of the laminated core 40. The cylindrical magnet 32 is magnetized for driving, with twelve poles along the circumferential direction. The surface of the cylindrical magnet 32 is treated for preventing rusting by electro deposition coating or spray coating.

The glued connection between the housing 44 and the base 4 is further described below. A ring-shaped first groove 4j, the center of which is along the rotational axis R of the rotor 6, is arranged on a side surface 4i of the bearing hole 4h of the base 4. The first groove 4j has a semicircular cross section. A ring-shaped second groove 44b, the center of which is along the rotational axis R, is arranged on an outer surface 44a of the housing 44, the outer surface 44a contacting the side surface 4i of the bearing hole 4h. The position of the second groove 44b with respect to its direction along the rotational axis R is different from the position of the first groove 4j with respect to its direction along the rotational axis R. The second groove 44b has a semicircular cross section.

The conductive resin 52 is applied on the edge portion 4l of the bearing hole 4h on the lower surface 4k of the base 4. This conductive resin 52 electrically connects the base 4 and the housing 44.

Each of the first groove 4j and the second groove 44b may have a polygonal cross section or semielliptical cross section or rounded cross section.

FIGS. 3A, 3B, 3C, 3D, and 3E are magnified views showing the step of fixing the bearing unit 12 to the base 4. First, the hub 28, then the shaft 26, then the sleeve 46, then the flange 30, then the housing 44, and the magnet 32 are assembled. As a result, the bearing unit 12 is mounted onto the rotor 6.

Figure 3A:
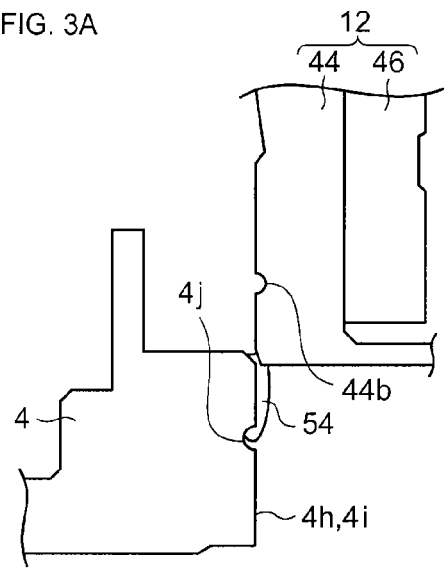
FIG. 3A is a magnified view showing the step of fixing a bearing unit as shown in FIG. 2 to a base.

Second, as shown in FIG. 3A, with regard to the side surface 4i of the bearing hole 4h of the base 4, the glue 54 is applied continuously to the first groove 4j so that the glue 54 encompasses the bearing hole 4h. In this case, the glue 54 is applied to the side surface 4i of the bearing hole 4h so that the glue 54 adheres to the first groove 4j when the bearing unit 12 is inserted into the bearing hole 4h. For example, the glue 54 can be applied to the first groove 4j or the region above the first groove 4j.

Figure 3B:
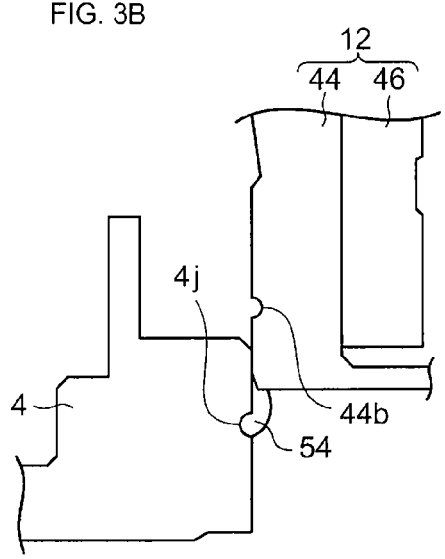
FIG. 3B is a magnified view showing the step of fixing the bearing unit as shown in FIG. 2 to the base.
Figure 3C:
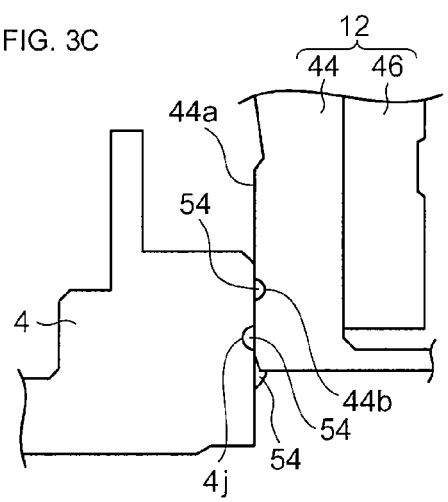
FIG. 3C is a magnified view showing the step of fixing the bearing unit as shown in FIG. 2 to the base.
Figure 3D:
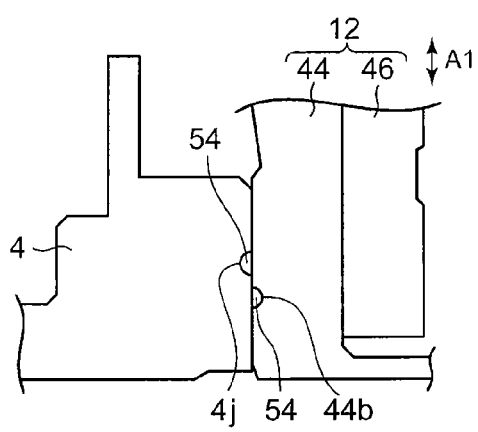
FIG. 3D is a magnified view showing the step of fixing the bearing unit as shown in FIG. 2 to the base.
Figure 3E:
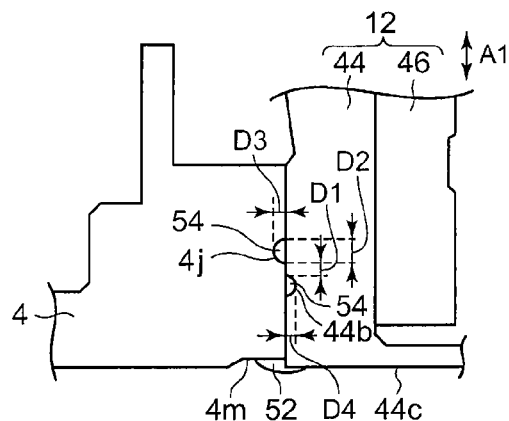
FIG. 3E is a magnified view showing the step of fixing the bearing unit as shown in FIG. 2 to the base.

Then, the bearing unit 12 is inserted into the bearing hole 4h from upside. As shown in FIG. 3B, as the bearing unit 12 is being inserted into the bearing hole 4h, the glue 54 is spread and moved to the side of the lower surface 4k of the base 4. However, the glue 54 does not move downwards across the first groove 4j before glue 54 fills up the first groove 4j. FIG. 3C shows the situation where the bearing unit 12 is inserted into the middle position. The first groove 4j is filled with glue 54. In addition, the glue 54 overflows in the second groove 44b and is stored in the second groove 44b, the second groove 44b being arranged on the outer surface 44a of the housing 44. FIG. 3D shows the situation where the bearing unit 12 is inserted to the desired position. In this situation, the first groove 4j and the second groove 44b do not overlap with respect to the direction A1 (vertical direction) along the rotational axis R of the rotor 6. However, there is a period, in the process of insertion, in which the first groove 4j faces the second groove 44b or, in other words, the first groove 4j is communicatively connected to the second groove 44b. Therefore, the second groove 44b can obtain enough amount of glue 54 to fill the second groove 44b. In this sense, in the present embodiment, the first groove 4j is located above (closer to the magnetic recording disk 8 side) the second groove 44b with respect to the vertical direction A1. Since an excess amount of glue 54 can be stored in the first groove 4j and the second groove 44b, there may not be any spill-out of the glue 54 onto the side of the lower surface 4k of the base 4, or, even if there is a spill-out, the amount of the spill-out should be tiny. As shown in FIG. 3E, a liquid conductive resin 52 is applied so that it starts from a cut portion 4*m* of the base 4 and reaches the bottom surface 44*c* of the housing 44. Then, the liquid conductive resin 52 is cured.

The positional relationship, in the vertical direction A1, between the first groove 4*j* and the second groove 44*b* depends on how the bearing unit 12 is inserted into the bearing hole 4*h*. In another embodiment where the bearing unit 12 is inserted from the bottom of the base 4, the first groove arranged on the base is located below the second groove arranged on the housing, in order to have a period in which the first groove faces the second groove.

In the present embodiment, the sum of the volume of the first groove 4*j* and the volume of the second groove 44*b* is designed to be a bit less than the volume of the glue 54 initially applied in FIG. 3A.

Referring to FIG. 3E, the first groove 4*j* and the second groove 44*b* are formed so that the distance D1, in the vertical direction A1, between the first groove 4*j* and the second groove 44*b* is less than the width D2 of the first groove 4*j* in the vertical direction A1. This can lead to more certainty with regard to filling the second groove 44*b* with the glue 54. This is because, the wider the distance D1 between the first groove 4*j* and the second groove 44*b* is, the more the glue 54 remains in the region between the first groove 4*j* and the second groove 44*b*, thereby the amount of the glue 54 existing in the second groove 44*b* is reduced.

The first groove 4*j* and the second groove 44*b* are formed so that both the depth D3 of the first groove 4*j* and the depth D4 of the second groove 44*b* are less than the width D2 of the first groove 4*j* in the vertical direction A1.

Figure 4:
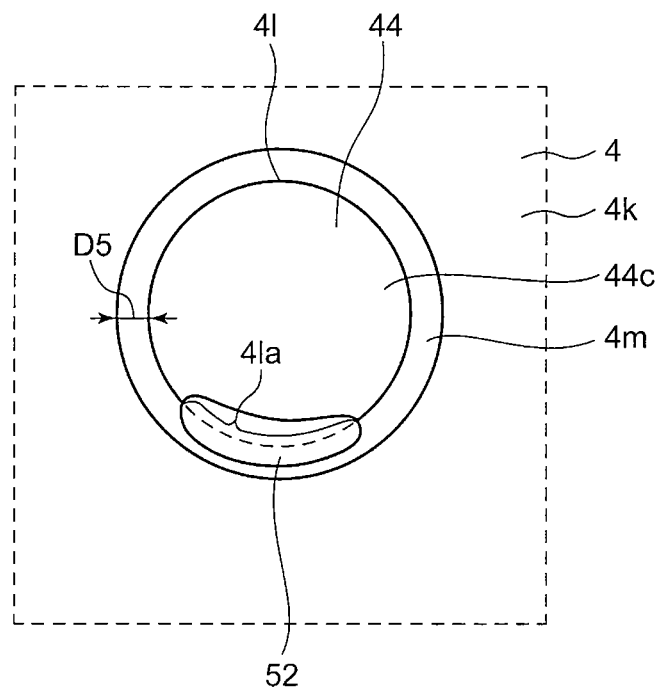
FIG. 4 is a magnified bottom view showing around an edge portion of a bearing hole on a lower surface of the base as shown in FIG. 2.

FIG. 4 is a magnified bottom view showing around the edge portion 4*l* of the bearing hole 4*h* on the lower surface 4*k* of the base 4. The cut portion 4*m* is arranged on the lower surface 4*k* of the base 4 by cutting along the edge portion 4*l* of the bearing hole 4*h*. The width D5 of the cut portion 4*m* in the radial direction is greater than the depth of the cut of the cut portion 4*m*. The conductive resin 52 is applied so that it starts from the cut portion 4*m* and reaches the bottom surface 44*c* of the housing 44. In particular, the conductive resin 52 is applied in the cut portion 4*m* so that the height (the thickness in the direction along the rotational axis R) of the conductive resin 52 is less than the depth of the cut of the cut portion 4*m*.

The conductive resin 52 is applied so that the conductive resin 52 covers an arc portion 4*la* of a predetermined length, such as the radius of the cylindrical portion of the housing 44, included in the edge portion 4*l* of the bearing hole 4*h*. The conductive resin 52 is applied so that the conductive resin 52 covers at least a part of the bottom surface 44*c* of the housing 44, the bottom surface 44*c* being exposed from the lower surface 4*k* of the base 4. This strengthens the electrical connection between the conductive resin 52 and the housing 44. The conductive resin 52 has a volume resistivity lower than 0.01 (ohm·cm).

Various materials can be adopted as the conductive resin 52. For example, a so-called, two-component epoxy in which polyoxypropylene diamine, as a hardener, is applied to a base resin, which is a mixture of an epoxy resin and silver powder, is easy to apply, is strong, has flexibility, and has good impact resistance. The two-component epoxy is also preferable in that there is a less volatile portion.

In the case where the volume of the second groove 44*b* is greater than the volume of the first groove 4*j*, it may be possible that the second groove 44*b* is not filled with the glue 54. In this case, since some air remains in the space where the glue 54 does not exist, the air may prevent anaerobic glue from curing, thereby reducing the glue strength. To cope with this, the volume of the second groove 44*b* may be made less than the volume of the first groove 4*j*. This is preferable in that the second groove 44*b* is easier to be filled with the glue 54.

Typical dimensions of the disk drive device 100 according to the present embodiment are as follows: D1=0.1 mm, D2=0.3 mm, D3=D4=0.05 mm, (the width of the second groove 44*b*)=0.25 mm, D5=0.6 mm, (the depth of the cut of the cut portion 4*m*)=0.2 mm.

Various types of glue can be adopted as the glue 54. An anaerobic glue containing an acrylic acid ester as a main ingredient is preferable in that it is easy to work with. This anaerobic glue does not cure while it is exposed to air. Once the anaerobic glue enters in a fitted portion between the housing 44 and the base 4, the anaerobic glue rapidly reacts, polymerizes, and cures. By this, one can obtain a first stage of strength within a short period of time. In addition, since there is less contraction, the anaerobic glue is preferably used as a sealant to prevent leaks at the fitted portion. Furthermore, in the case where ultraviolet curability is given to the anaerobic glue, it is preferable in that spilled-out glue can be cured within a short period of time by irradiating ultraviolet light, thereby the work piece can be made rapidly available to handle.

It is possible that the glue 54 or the conductive resin 52 gradually emits a volatile portion. This volatile portion may contaminate the clean space 24 and may prevent normal data read/write operation. To cope with this, the disk drive device 100 in assembly may be put in a high-temperature container for a long period of time, after assuring the electrical connection between the base 4 and the housing 44 by gluing the base 4 and the bearing unit 12 using the glue 54 and applying the conductive resin 52, and before mounting the magnetic recording disk 8 onto the rotor 6. This can accelerate the removal of the volatile portion of the glue 54 or the conductive resin 52. For example, by putting the disk drive device 100 in the high-temperature container for more than one hour while keeping the temperature of the high-temperature container higher than 65 degrees Celsius, most of the volatile portion of the glue 54 or the conductive resin 52 can be removed. By putting the disk drive device 100 in the high-temperature container for more than one hour while keeping the temperature of the high-temperature container higher than 75 degrees Celsius, a sufficient amount of the volatile portion of the glue 54 or the conductive resin 52 can be removed. By keeping the temperature of the high-temperature container lower than 100 degrees Celsius, it is possible to prevent the glue 54 or the conductive resin 52 from denaturing or being weakened due to heat.

The operation of the disk drive device 100 as described above shall be described below. The three-phase driving current is supplied to the coils 42 to rotate the magnetic recording disk 8. The driving fluxes are generated along the nine teeth by making the driving current flow through the coils 42. These driving fluxes give torque to the cylindrical magnet 32, and the rotor 6 and the magnetic recording disk 8, which is fitted to the rotor 6, rotate. Along with this, the voice coil motor 16 swings the swing arm 14, and the read/write head goes back and forth within the swing range on the magnetic recording disk 8. The read/write head converts magnetic data recorded on the magnetic recording disk 8 to an electrical signal and transmits the electrical signal to a control board (not shown). The read/write head also converts data sent from the control board in a form of an electrical signal to magnetic data and writes the magnetic data on the magnetic recording disk 8.

In the disk drive device 100 according to the present embodiment, the glue 54 is stored in the first groove 4j and the second groove 44b in the process of gluing the bearing unit 12 to the base 4. Therefore, the amount of the glue 54 that overflows onto the side of the lower surface 4k of the base 4 is reduced. As a result, if there is a portion, on the edge portion 4l of the bearing hole 4h, where the glue 54 does not overflow, by applying the conductive resin 52 to the portion, the electrical connection between the base 4 and the housing 44 can be made more assured. In addition, since the amount of the glue 54 that overflows is suppressed, the disk drive device 100 can be made thinner by the amount of the suppressed height of the glue 54.

In the case where the conductive resin 52 is applied onto the overflowing glue 54, since the amount of the overflowing glue is tiny, the electrical connection between the base 4 and the housing 44 can also be made more assured, and the disk drive device 100 can be made thinner.

In the case where the glue 54 of the amount comparable to the sum of the volume of the first groove 4j and the volume of the second groove 44b is used, there is only little amount of the glue 54 that overflows to the side of the lower surface 4k of the base 4. Therefore, the base 4 and the bearing unit 12 can be glued together using a sufficient amount of the glue 54. This strengthens the rigidity of the glued connection. In addition, the first groove 4j, which is filled with the glue 54, and the second groove 44b serve as glue storage. This strengthens the rigidity of the glued connection between the base 4 and the bearing unit 12.

In order to keep the air tightness of the clean space 24, it is necessary to assure the air tightness at the glued portion between the base 4 and the bearing unit 12. In general, in the case where glue is applied to the contact portion between two surfaces, the air tightness there may not be so high since, for example, the glue does not spread on an entire surface. By having a structure where the glue 54 is filled in the ring-shaped first groove 4j as in the disk drive device 100 according to the present embodiment, the air tightness can be more assured at the groove. In addition, since the ring-shaped second groove 44b is arranged at the position where the second groove 44b does not overlap, in the vertical direction A1, with the first groove 4j, a double-sealing effect can be obtained. In summary, the disk drive device 100 according to the present embodiment is preferable in light of the air tightness at the glued connection between the base 4 and the bearing unit 12.

These advantages can be more clearly understood by comparing the present embodiment with the following related art that the inventors of the present invention considered. FIGS. 5A, 5B, 5C, and 5D are magnified views showing the step of fixing a bearing unit 56 to a base 58 in the disk drive device according to the related art. In the disk drive device according to the related art, no groove is arranged on a side surface 58b of the bearing hole 58a of the base 58. Similarly, no groove is arranged on an outer surface 60a of a housing 60. No cut portion is arranged on a lower surface 58c of the base 58. The bearing unit 56 includes the housing 60 and the sleeve 62.

Figure 5A:
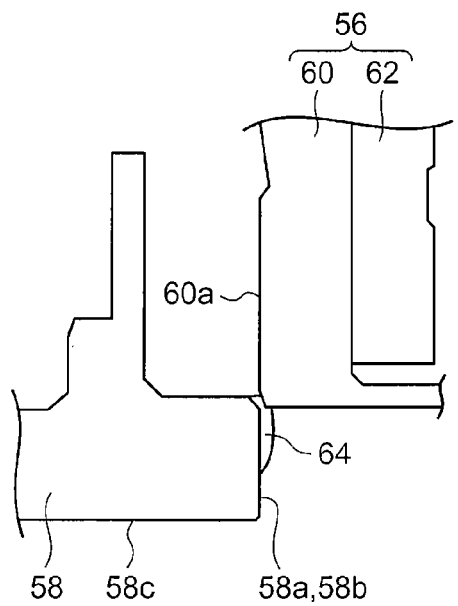
FIG. 5A is a magnified view showing the step of fixing a bearing unit to a base in a disk drive device according to a related art.
Figure 5B:
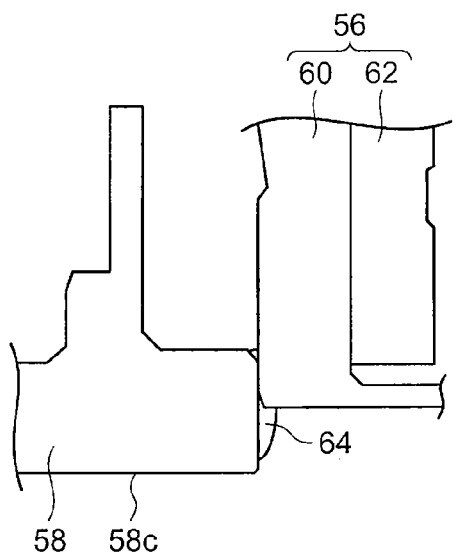
FIG. 5B is a magnified view showing the step of fixing the bearing unit to the base in the disk drive device according to the related art.
Figure 5C:
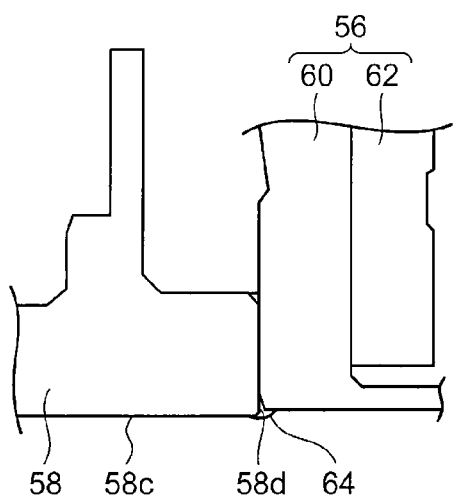
FIG. 5C is a magnified view showing the step of fixing the bearing unit to the base in the disk drive device according to the related art.
Figure 5D:
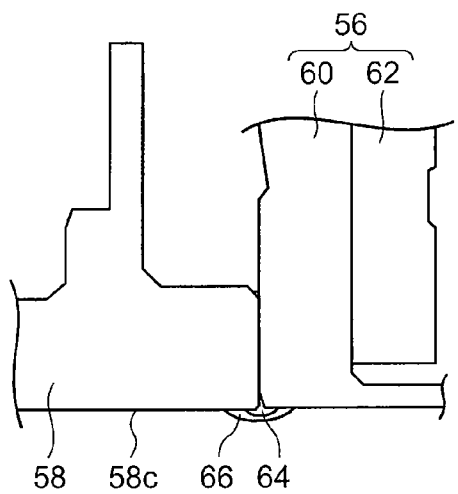
FIG. 5D is a magnified view showing the step of fixing the bearing unit to the base in the disk drive device according to the related art.

As shown in FIG. 5A, the glue 64 is applied continuously to the upper side of the side surface 58b of the bearing unit 58a of the base 58 so that the glue 64 encompasses the bearing hole 58a. Then, the bearing unit 56 is inserted into the bearing hole 58a from the upside. FIG. 5B shows that, as the bearing unit 56 is being inserted into the bearing hole 58a, the glue 64 is spread and moved to the side of the lower surface 58c of the base 58. FIG. 5C shows the situation where the bearing unit 56 is inserted into the desired position. A considerable amount of the glue 64, which is applied in FIG. 5A, overflows from the edge portion 58d of the bearing hole 58a and sticks out downwards from the lower surface 58c of the base 58. In FIG. 5D, a conductive resin 66 is applied and cured on top of the overflowing cured glue 64.

In the disk drive device according to the related art, the glue 64 is spread and overflows to the side of the lower surface 58c of the base 58, then the overflowing glue is cured. Therefore, the glue 64 sticks out downwards from the lower surface 58c of the base 58. As a result, the conductive resin 66 is applied on top of the glue 64 that is sticking out. In this case, the conductive resin 66 may not spread out nicely, which may cause an insufficient electrical connection between the housing 60 and the base 58.

In order to make the electrical connection more assured in the above situation, one may consider that one applies a greater amount of the conductive resin 66 on top of the glue 64 that is sticking out. However, in this case, the more one applies the conductive resin 66, the larger the downward part that sticks would be. As it becomes larger, the thickness of the whole disk drive device becomes larger. There is a case where the thickness of the whole disk drive device is defined by a standard. In such a case, the disk drive device may be designed so that the whole thickness is within the standard by making the other parts, such as the housing 60 or the base 58, thinner. Thinning the housing 60 or the base 58 may cause deterioration in the glue strength or the stiffness.

One may consider reducing the amount of the glue 64. However, this may create a disk drive device that has a weak glue strength and, therefore, may not be preferable. Furthermore, reducing the amount of the glue 64 may create leaks at the connection between the housing 60 and the base 58, thereby giving insufficient sealing to the clean space. In this case, fine particles in the air may enter the clean space, and may cause malfunction of the magnetic recording disk or the read/write head.

In the disk drive device 100 according to the present embodiment, at least one of these disadvantages is addressed.

In the disk drive device 100 according to the present embodiment, the first groove 4j and the second groove 44b are formed so that both the depth D3 of the first groove 4j and the depth D4 of the second groove 44b are less than the width D2 of the first groove 4j in the vertical direction A1. Therefore, in particular in the case where an anaerobic glue is used as the glue 54, the glue 54 is favorably cured in the first groove 4j and in the second groove 44b. According to experiments performed by the inventors of the present invention, the anaerobic glue is favorably cured under the condition that both the depth D3 of the first groove 4j and the depth D4 of the second groove 44b are less than 0.07 mm.

In the disk drive device 100 according to the present embodiment, the cut portion 4m is arranged on the lower surface 4k of the base 4, and the conductive resin 52 is applied so that it starts from the cut portion 4m and reaches the bottom portion of the housing 44. Therefore, the amount of increase of the thickness of the whole disk drive device 100 according to the thickness of the conductive resin 52 can be reduced by the amount corresponding to the depth of the cut portion 4m.

In the disk drive device 100 according to the present embodiment, the conductive resin 52 is applied in the cut portion 4m so that the height of the conductive resin 52 is less than the depth of the cut of the cut portion 4m. This can reduce the amount of increase of the thickness of the whole disk drive device 100 according to the thickness of the conductive resin 52.

According to experiments performed by the inventors of the present invention, the glue 54 that overflows to the side of the lower surface 4k of the base 4 spreads inside the cut portion 4m, and the conductive resin 52 does not stick out from the cut portion 4m even if a sufficient amount of the conductive resin 52 is applied, under the condition that the width D5 of the cut portion 4m in the radial direction is 0.6 mm and the depth of the cut of the cut portion 4m is 0.2 mm.

In the disk drive device 100 according to the present embodiment, there is a lesser amount of the glue 54 that overflows to the side of the lower surface 4k of the base 4. In particular, in most cases, the length of the portion, in the edge portion 4l of the bearing hole 4h, where the glue 54 visually overflows is shorter than the radius of the cylindrical portion of the housing 44. Therefore, by avoiding such a portion and applying the conductive resin 52 so that the conductive resin 52 covers the arc portion 4la of the length comparable to the radius of the cylindrical portion of the housing 44, the electrical connection between the base 4 and the housing 44 can be made more assured, and that conductive resin 52 which sticks out downwards can be suppressed.

It can be said that the trouble due to static electricity during the operation of the disk drive device 100 can be prevented by having an electrical resistance between the base 4 and the housing 44 of lower than 100 Ohms. The base 4, if it is made of aluminum, can be oxidized. In this case, covering the surface of the base 4 on which an oxide film is formed by the conductive resin 52 would not stably give a desired conductivity. To cope with this, in the disk drive device 100 according to the present embodiment, the conductive resin the volume resistivity of which is lower than or equal to 0.01 (ohm·cm) is applied on the cut surface of the cut portion 4m. As a result, it is possible to stably obtain the electrical resistance of lower than 100 Ohms between the base 4 and the housing 44, and the trouble due to static electricity can be reduced.

Above is an explanation based on the exemplary embodiments. These embodiments are intended to be illustrative only, and it will be obvious to those skilled in the art that various modifications to constituting elements and processes could be developed and that such modifications are also within the scope of the present invention.

The embodiment describes the so-called outer-rotor type of the disk drive device 100 in which the cylindrical magnet 32 is located outside the laminated core 40. However, the present invention is not limited to this. For example, the present invention may be applied to the so-called inner-rotor type of the disk drive device in which the cylindrical magnet is located inside the laminated core.

The embodiment describes the case where the bearing unit 12 is fixed to the base 4, and the shaft 26 rotates with respect to the bearing unit 12. However, the present invention is not limited to this. For example, the present invention may be applied to a shaft-fixed type of the disk drive device in which the shaft is fixed to the base, and the bearing unit and the hub rotate together with respect to the shaft. In this case, the present invention may be applied when the shaft and the base are formed separately and the shaft is inserted into and glued at a hole arranged on the base.

The embodiment describes the case where the bearing unit 12 is directly mounted onto the base 4. However, the present invention is not limited to this. For example, a brushless motor comprising a rotor, a bearing unit, a laminated core, coils, and a base can separately be manufactured, and the manufactured brushless motor can be installed on a chassis.

The embodiment describes the case where the laminated core is used. However, the present invention is not limited to this. The core does not have to be a laminated core.

The embodiment describes the case where the housing 44 and the sleeve 46 are separate parts. However, the present invention is not limited to this. For example, the housing and the sleeve can be made as a single unit. In this case, the number of parts can be reduced, and it may become easier to assemble.

Figure 6:
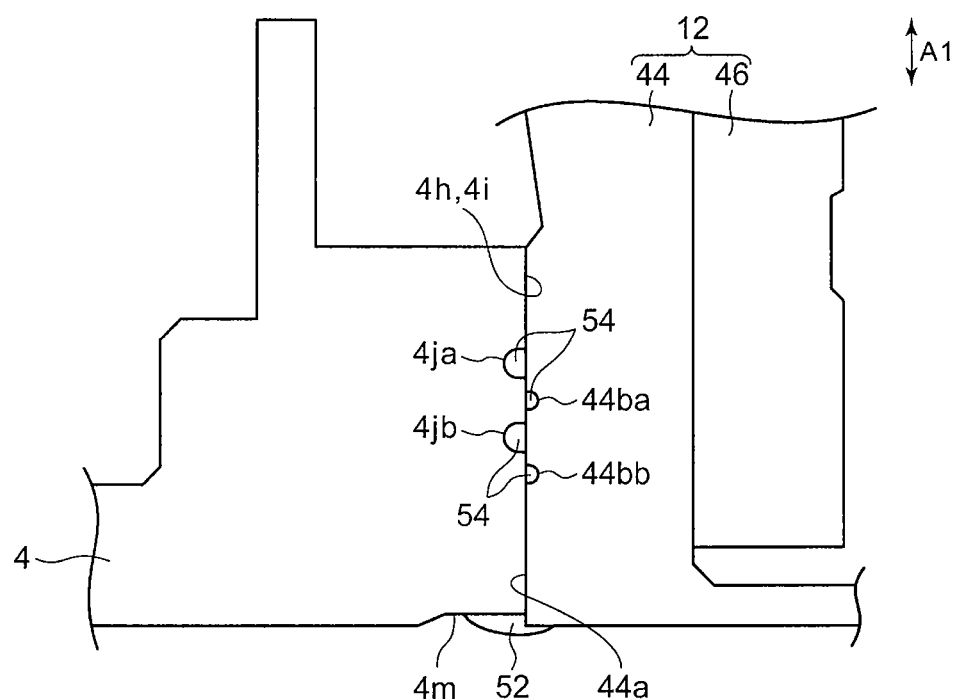
FIG. 6 is a magnified cross section of a glued portion between a bearing unit and a base in a disk drive device according to the first modification.

The embodiment describes the case where one first groove 4j is arranged on the side surface 4i of the bearing hole 4h of the base 4, and one second groove 44b is arranged on the outer surface 44a of the housing 44. However, the present invention is not limited to this. For example, the number of the grooves is not limited. FIG. 6 is a magnified cross section of the glued portion between the bearing unit 12 and the base 4 in the disk drive device according to the first modification. FIG. 6 corresponds to FIG. 3E. In the disk drive device according to this modification, two ring-shaped grooves 4ja, 4jb, the centers of which are along the rotational axis R of the rotor 6, are arranged on the side surface 4i of the bearing hole 4h of the base 4. Two ring-shaped grooves 44ba, 44bb, the centers of which are along the rotational axis R of the rotor 6, are arranged on the outer surface 44a of the housing 44. The two grooves 4ja, 4jb, arranged on the side surface 4i of the bearing hole 4h, and the two grooves 44ba, 44bb, arranged on the outer surface 44a of the housing 44, are formed alternately in the vertical direction A1. In this case, the glue strength and the air tightness can be improved.

Figure 7:
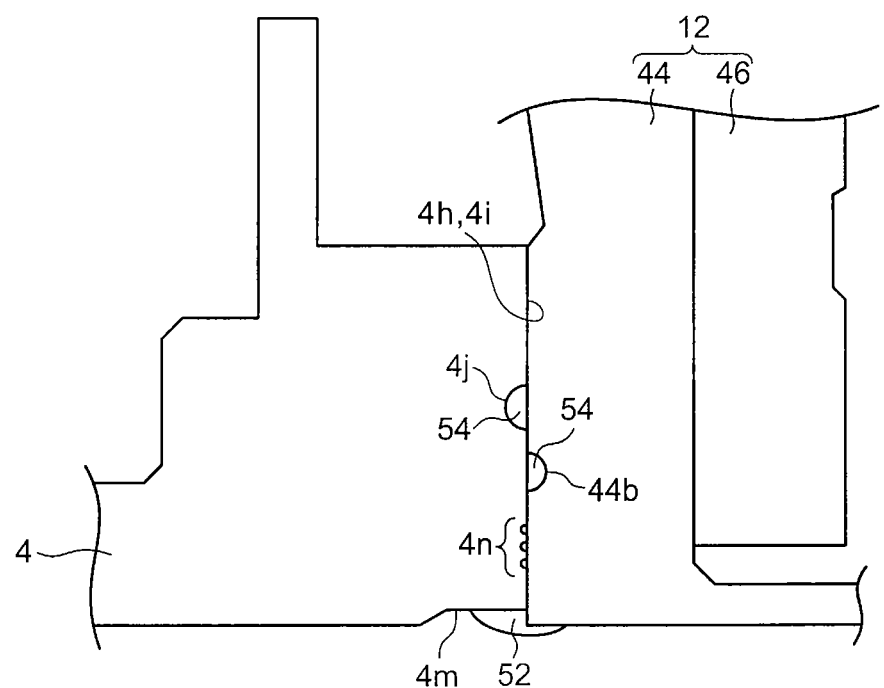
FIG. 7 is a magnified cross section of a glued portion between a bearing unit and a base in a disk drive device according to the second modification.

FIG. 7 is a magnified cross section of a glued portion between the bearing unit 12 and the base 4 in the disk drive device according to the second modification. FIG. 7 corresponds to FIG. 3E. In the disk drive device according to this modification, a zonal region 4n formed by a plurality of grooves smaller than the first groove 4j is arranged on a portion of the side surface 4i of the bearing hole 4h, the portion being below the first groove 4j.

In the case where a glue 54 having a low viscosity is used, the glue 54 droops down to the side of the lower surface 4k of the base 4 in the process of gluing the bearing unit 12 to the base 4. The zonal region 4n can stop the drooping glue 54 there by surface tension. Therefore, it is possible to use the glue 54 having low viscosity without being concerned about drooping to the side of the lower surface 4k of the base 4. A glue 54 having a low viscosity is preferable in that it is easy to get in the gap between the outer surface 44a of the housing 44 and the side surface 4i of the bearing hole 4h of the base 4. According to the experiments performed by the inventors of the present invention, favorable results with regard to stopping the droop is obtained under the condition that fifty fine grooves are arranged in the zonal region 4n and that the depth of each groove is more than 4 µm. It is preferable to design the depth of each groove to be less than 10 µm since the zonal region 4n can be processed within a short period of time.

While the preferred embodiments of the present invention have been described using specific terms, such description is for illustrative purposes only, and it is to be understood that changes and variations may be made without departing from the spirit or scope of the appended claims.

What is claimed is:

1. A disk drive device, comprising:
    a rotor on which a recording disk is to be mounted;
    a base having a bearing hole, the center of which is along the rotational axis of the rotor; and
    a bearing unit rotatably supporting the rotor with respect to the base, the bearing unit being glued in the bearing hole,
    wherein a ring-shaped first groove, the center of which is along the rotational axis, is arranged on a side surface of the bearing hole,
    wherein a ring-shaped second groove, the center of which is along the rotational axis, is arranged on a cylindrical surface of the bearing unit, the cylindrical surface contacting the side surface of the bearing hole, wherein the position of the second groove with respect to its direction along the rotational axis is different from the position of the first groove with respect to its direction along the rotational axis, wherein the base and the bearing unit are electrically connected by a conductive resin applied along an edge portion of the bearing hole, the edge portion being on a second surface of the base that is on the opposite side of a first surface of the base on which the rotor is arranged, wherein the first groove is filled with a glue, and the second groove is filled with a glue that is the same as that filled in the first groove, wherein the glue that exists between the bearing hole and the bearing unit has a volume that is comparable to the sum of the first groove's volume and the second groove's volume, and wherein at least a part of the conductive resin is applied onto a portion of the glue overflowing onto the second surface of the base.

2. The disk drive device according to claim 1, wherein the distance, in the direction along the rotational axis, between the first groove and the second groove is less than the width of the first groove in the direction along the rotational axis.

3. The disk drive device according to claim 1, wherein both the depth of the first groove and the depth of the second groove are less than the width of the first groove in the direction along the rotational axis.

4. The disk drive device according to claim 1, wherein a zonal region formed by a plurality of grooves smaller than the first groove is arranged on a portion of the side surface of the bearing hole, the portion being closer to the second surface than the first groove.

5. The disk drive device according to claim 4, wherein the plurality of small grooves in the zonal region are formed so that the depth of each groove is in between 4 mm and 10 mm.

6. The disk drive device according to claim 1, further comprising:
a core fixed on the first surface of the base, the core having a ring portion and a plurality of teeth that extend radially from the ring portion,
wherein a ring-shaped wall, the center of which is along the rotational axis, is arranged on the first surface of the base, and
wherein an inner surface of the wall forms a part of the side surface of the bearing hole, and
wherein an outer surface of the wall is fitted in a center hole of the ring portion of the core, and
wherein the core is fixed at the position where the core surrounds a portion of the side surface of the bearing hole, the portion contacting the cylindrical surface of the bearing unit.

7. The disk drive device according to claim 1, wherein the rotor includes:
a hub on which the recording disk is to be mounted; and
a shaft fixed at the center of the hub,
wherein the bearing unit includes:
a sleeve accommodating a part of the shaft and rotatably supporting the shaft; and
a housing surrounding the sleeve and fixing the sleeve,
wherein the housing and the sleeve are formed as a single unit.

8. The disk drive device according to claim 1, wherein the rotor includes:
a hub on which the recording disk is to be mounted; and
a shaft fixed at the center of the hub,
wherein the bearing unit includes:
a sleeve accommodating a part of the shaft and rotatably supporting the shaft; and
a housing surrounding the sleeve and fixing the sleeve,
wherein the housing is formed to be cup-shaped by integrating a cylindrical portion and a bottom portion as a single unit.

9. The disk drive device according to claim 1, wherein a cut portion made by cutting along the edge portion of the bearing hole is formed on the second surface of the base and wherein the conductive resin is applied to start from the cut portion and to reach the bearing unit.

10. The disk drive device according to claim 9, wherein the conductive resin is applied in the cut portion so that the height of the conductive resin is less than the depth of the cut of the cut portion.

11. The disk drive device according to claim 1, wherein the conductive resin is applied so that the conductive resin covers an arc portion of a predetermined length included in the edge portion of the bearing hole.

12. The disk drive device according to claim 11, wherein the conductive resin is applied so that the conductive resin covers at least a part of an end surface of the bearing unit, the end surface being exposed from the second surface.

13. The disk drive device according to claim 1, wherein the conductive resin has a volume resistivity lower than 0.01 (ohm·cm).

14. The disk drive device according to claim 1, wherein a ring-shaped third groove, the center of which is along the rotational axis, is arranged on the side surface of the bearing hole, and
wherein the position of the third groove with respect to its direction along the rotational axis is different from the position of the first groove with respect to its direction along the rotational axis, and
wherein a ring-shaped fourth groove, the center of which is along the rotational axis, is arranged on the cylindrical surface of the bearing unit, and
wherein the position of the fourth groove with respect to its direction along the rotational axis is different from the position of the second groove with respect to its direction along the rotational axis, and
wherein the set of the first groove and the third groove and the set of the second groove and the fourth groove are formed alternately in the direction along the rotational axis.

15. The disk drive device according to claim 1, wherein the thickness of the conductive resin is included in the thickness of the disk drive device.

16. A disk drive device, comprising:
a rotor on which a recording disk is to be mounted;
a base having a bearing hole, the center of which is along the rotational axis of the rotor; and
a bearing unit rotatably supporting the rotor with respect to the base, the bearing unit being glued in the bearing hole,
wherein a ring-shaped first groove, the center of which is along the rotational axis, is arranged on a side surface of the bearing hole,
wherein a ring-shaped second groove, the center of which is along the rotational axis, is arranged on a cylindrical surface of the bearing unit, the cylindrical surface contacting the side surface of the bearing hole,
wherein the position of the second groove with respect to its direction along the rotational axis is different from the position of the first groove with respect to its direction along the rotational axis, wherein the first groove is filled with a glue, and the second groove is filled with a glue that is the same as that filled in the first groove, wherein the base and the bearing unit are electrically connected by a conductive resin applied over the base and the bearing unit, wherein the glue that exists between the bearing hole and the bearing unit has a volume that is comparable to the sum of the first groove's volume and the second groove's volume, and wherein at least a part of the conductive resin is applied onto a portion of the glue overflowing on the base.

17. The disk drive device according to claim 16, wherein the distance, in the direction along the rotational axis, between the first groove and the second groove is less than the width of the first groove in the direction along the rotational axis.

18. The disk drive device according to claim 16, wherein both the depth of the first groove and the depth of the second groove are less than the width of the first groove in the direction along the rotational axis.

19. The disk drive device according to claim 16, wherein the amount of the glue that exists between the bearing hole and the bearing unit is comparable to the sum of the volumes of the first groove and the second groove.

20. The disk drive device according to claim 16, wherein a zonal region formed by a plurality of grooves smaller than the first groove is arranged on a portion of the side surface of the bearing hole, the portion being closer to a second surface of the base than the first groove, the second surface being on the opposite side of a first surface of the base on which the rotor is arranged.

21. The disk drive device according to claim 16, wherein the thickness of the conductive resin is included in the thickness of the disk drive device.

* * * * *